June 22, 1965 T. E. DUGLE ETAL 3,190,431
ARTICLE FEEDING DEVICE FOR A PACKAGING MACHINE
Filed April 22, 1963 2 Sheets-Sheet 1

INVENTOR.
THOMAS E. DUGLE
ROLAND W. WAGNER
BY Pearce Schaeperklaus
Attorneys

June 22, 1965 T. E. DUGLE ETAL 3,190,431
ARTICLE FEEDING DEVICE FOR A PACKAGING MACHINE
Filed April 22, 1963 2 Sheets-Sheet 2
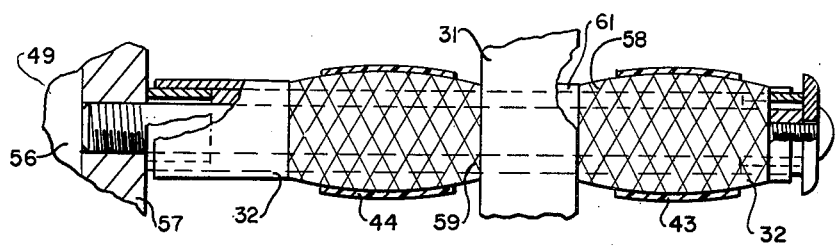
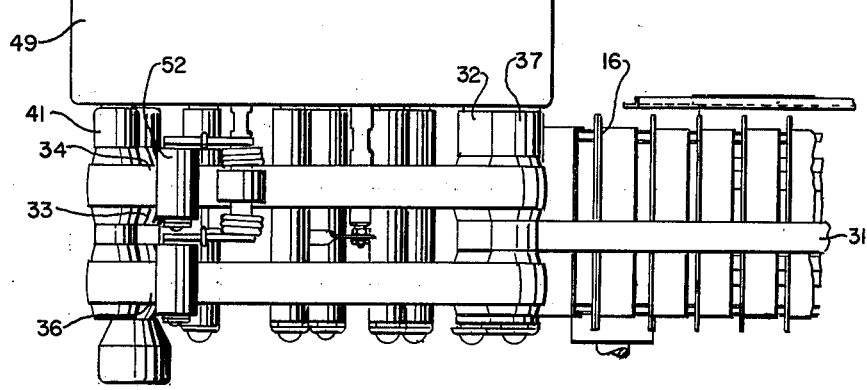
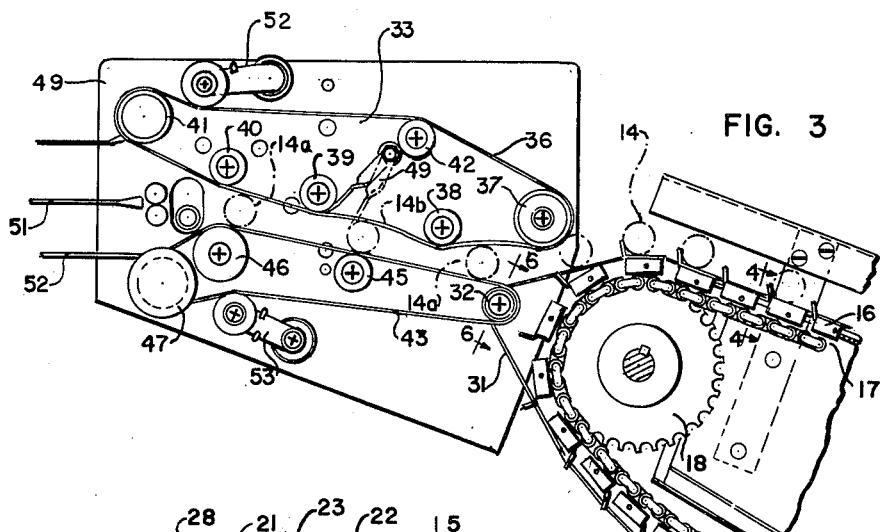
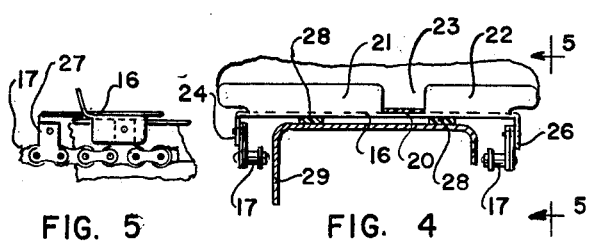
INVENTOR.
THOMAS E. DUGLE
ROLAND W. WAGNER
BY Pearce Schaeperklaus
Attorneys

United States Patent Office 3,190,431
Patented June 22, 1965

3,190,431
ARTICLE FEEDING DEVICE FOR A
PACKAGING MACHINE
Thomas E. Dugle, Indian Hill, and Roland W. Wagner, Sharonville, Ohio, assignors, by mesne assignments, to Warrick Equipment Corp., Cincinnati, Ohio, a corporation of Ohio
Filed Apr. 22, 1963, Ser. No. 274,749
5 Claims. (Cl. 198—22)

This invention relates to packaging machines. More particularly, this invention relates to a device for advancing cylindrical articles in a packaging machine. The device of this invention represents an improvement over the type of machine shown in our copending application Serial No. 115,041, filed June 5, 1961.

An object of this invention is to provide means for smoothly transferring a cylindrical device from a first conveyor to a second conveyor.

A further object of this invention is to provide a device of this type which transfers articles from a conveyor having a series of individual pockets or trays, each of which carries one article, to a pair of belt conveyors which engage the articles therebetween to transport the articles past counting mechanism and to receptacles for the articles.

A further object of this invention is to provide, in combination with a first conveyor having a plurality of bucket or tray members and a second conveyor including a pair of belts for engaging articles therebetween, of a transfer belt which runs on the bucket containing carrier and also runs on a support for one of the belt conveyors to bridge the gap between the pocket containing conveyor and the belt conveyor.

The above and other objects and features of the invention will be apparent to those skilled in the art to which this invention pertains from the following detailed description and the drawings, in which:

FIG. 2 is an enlarged plan view of a portion of an article conveyor thereof together with a belt conveyor section thereof;

FIG. 3 is an enlarged view in side elevation, partly broken away and in section, of the portion of the machine illustrated in FIG. 2, wieners being shown in dot-dash lines in association therewith;

FIG. 4 is a view in section taken on the line 4—4 in FIG. 3;

FIG. 5 is an enlarged fragmentary view in side elevation showing details of tthe article conveyor and taken in the direction of the arrows 5—5 in FIG. 4, one bucket of the article conveyor being removed from its support for clarity; and FIG. 6 is an enlarged fragmentary view in section taken on the line 6—6 in FIG. 3.

In the following detailed description, and the drawings, like reference characters indicate like parts.

Figure 1:
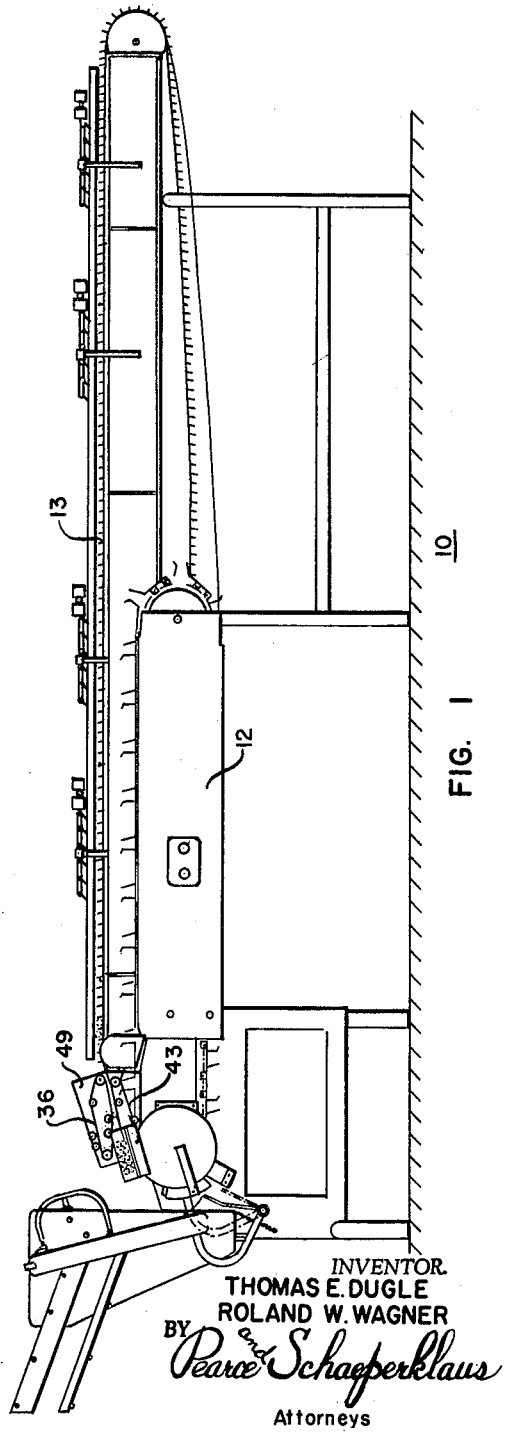
FIG. 1 is a view in side elevation of a packaging machine embodying conveyors constructed in accordance with an embodiment of this invention.

In FIG. 1 is shown a machine 10 for counting and packaging articles. The machine includes a main frame 12 which supports an article conveyor 13. Wieners 14 (FIG. 3) are fed to the article conveyor by appropriate machinery (not shown), and the article conveyor advances the wieners to the left, as shown in FIGS. 1 and 3, with each wiener being supported in a bucket 16. The buckets 16 are supported on chains 17 which run on sprockets 18 (FIG. 3) and 19 (FIG. 1).

Each of the buckets 16 includes a transverse plate portion or base 20 (see FIG. 2) and a rearwardly extending back at a leading edge thereof and including portions 21 and 22 (FIG. 4) separated by a slot 23. Wings or flanges 24 and 26 (FIG. 4) extend downwardly at opposite ends thereof. The wings are attached to upwardly projecting arms 27 (FIG. 5) of links of the chains 17 as shown most clearly in FIGS. 4 and 5. As shown in FIG. 4, in a main or horizontal course of the article conveyor, the buckets ride on tracks 28 which are mounted on a frame member 29. The tracks are formed of strips of nylon or the like. As shown in FIG. 4, a belt 31 runs through the slots. The belt 31, as shown in FIG. 3, is slightly longer than the chain conveyor and can travel therewith. The belt 31 is formed of strong flexible plastic material such as that commonly known as Mylar and extends over a roller 32 which is spaced from the article conveyor. As the wieners 14 pass around the left-hand end or discharge section of the article conveyor, the belt 31 raises the wieners from the buckets, as indicated most clearly in FIG. 3.

From the article conveyor 13, the wieners are transferred by the transfer belt 31 to a belt conveyor 33, details of construction of which are shown in FIGS. 2 and 3. The belt conveyor includes a pair of upper belts 34 and 36 (FIG. 2) which run on rollers 37, 38, 39, 40, 41, and 42 (FIG. 3) and a pair of lower belts 43 (FIG. 3) and 44 (FIG. 6) which run on the roller 32 and on rollers 45, 46, and 47 (FIG. 3). The rollers 41 and 47 are driven by mechanism inside a gear box 49 (FIG. 2, not shown in detail) which drives the rollers 41 and 47 in opposite directions but at equal speeds with the belts of the belt conveyor moving faster than the article conveyor, so that the wieners are substantially spaced, as indicated at 14a, 14b, and 14c in FIG. 3 as the wieners pass along the belt conveyor. As the wieners travel along the belt conveyor, the wieners pass pivotally mounted counter arm 49 which normally extends in the path of the wieners as shown in full lines in FIG. 3, but can be swung to the dot-dash line position by each wiener as the wiener passes there-along. The arm 49 is connected to and operates counting mechanism (not shown) which counts the wieners and controls mechanism (not shown in detail) for directing the wieners into trays 51 and 52 in the manner described more fully in our copending application Serial No. 115,041, filed June 5, 1961, already mentioned hereinabove. The belts 34, 36, 43, and 44 are kept taut by tightening devices 52 and 53 which resiliently maintain the belts in tension so that the belts can grip the wieners. As shown, the rollers which back up the upper pair of belts are laterally spaced from the rollers which back up the lower pair of belts, with the exception of rollers 40 and 46, so that the belts can yield to permit the wieners to pass the back-up rollers. The rollers 40 and 46 are just sufficiently spaced that a wiener held by the belts can pass therebetween.

The roller 32, which carries both the lower pair of belts 43 and 44 and also the transfer belt 31, is rotatably mounted on a stud 56 which is mounted in a wall 57 of the gear box 49. The roller 32 includes spaced, knurled convex sections 58 and 59 on which the belts 43 and 44 run, and a smooth, polished, cylindrical section 61 therebetween on which the transfer belt 31 runs. The roller 32 turns with the belts 43 and 44, but the transfer belt 31 has a slipping engagement therewith so that the belts 43 and 44 can run faster than the transfer belt 31.

As shown, the buckets of the article conveyor are arranged in tandem fashion, and each of the article buckets 16 is adapted to hold one wiener with the axis of the wiener extending transversely of the article conveyor. The transfer belt 31 serves to pick up each wiener from the bucket in which it is carried as the bucket swings downwardly around the sprocket 18 (FIG. 3) at the discharge section of the article conveyor and moves the wiener outwardly along the back of the bucket until the wiener is gripped by the belts of the belt conveyor so that there is a smooth transfer of each wiener from the article conveyor to the belt conveyor.

The conveyor structures described above and illustrated in the drawings are subject to structural modification without departing from the spirit and scope of the appended claims.

Having described our invention, what we claim as new and desire to secure by Letters Patent, is:

1. In a machine for handling cylindrical articles, the combination of an endless article conveyor comprising a plurality of article buckets arranged in tandem fashion, each of said article buckets being constructed to hold one article with the axis thereof extending transversely of the article conveyor, said article conveyor having a substantially horizontal main course and a downwardly extending discharge section at a discharge end of the main course, upper and lower belt conveyors mounted adjacent the discharge section, said belt conveyors having spaced article engaging courses adapted to engage the articles therebetween, a roller supporting one end of the lower belt conveyor adjacent the discharge section and a transfer belt running in the buckets of the article conveyor and mounted on said roller adjacent the lower belt conveyor to transfer the articles from the article conveyor to the belt conveyors.

2. In a machine for handling cylindrical articles, the combination of an endless article conveyor comprising a plurality of article buckets arranged in tandem fashion, each of said article buckets being constructed to hold one article with the axis thereof extending transversely of the article conveyor, said article conveyor having a substantially horizontal main course and a discharge section at a discharge end of the main course extending downwardly therefrom, each of said buckets having a base for supporting an article and a back extending upwardly therefrom when the bucket is in the main course, there being a slot in the back of each bucket, upper and lower belt conveyors mounted adjacent the discharge section, said belt conveyors having spaced article engaging courses adapted to engage the articles therebetween, a roller supporting one end of the lower belt conveyor adjacent the discharge section and a transfer belt running on the bases and in the slots of the backs of the buckets of the article conveyor and mounted on said roller adjacent the lower belt conveyor to transfer articles from the article conveyor to the belt conveyors.

3. In a machine for handling cylindrical articles, the combination of an endless article conveyor comprising a plurality of article buckets arranged in tandem fashion, each of said article buckets being constructed to hold one article with the axis thereof extending transversely of the article conveyor, said article conveyor having a substantially horizontal main course and a discharge section at a discharge end of the main course extending downwardly therefrom, upper and lower pairs of belt conveyors mounted adjacent the discharge section, said belt conveyors having spaced article engaging courses adapted to engage the articles therebetween, a roller supporting ends of the belts of the lower pair of belt conveyors adjacent the discharge section and a transfer belt running on the bases of the buckets of the article conveyor and mounted on said roller between the belts of the lower pair of belt conveyors to transfer the articles from the article conveyor to the belt conveyors.

4. In a machine for handling cylindrical articles, the combination of an endless article conveyor comprising a plurality of article buckets arranged in tandem fashion, each of said article buckets being constructed to hold one article with the axis thereof extending transversely of the article conveyor, said article conveyor having a substantially horizontal main course and a discharge section at a discharge end of the main course extending downwardly therefrom, each of said buckets having a base for supporting an article and a back extending upwardly therefrom when the bucket is in the main course, there being a slot in the back of each bucket, upper and lower pairs of belt conveyors mounted adjacent the discharge section, said belt conveyors having spaced article engaging courses adapted to engage the articles therebetween, a roller supporting one end of the lower belt conveyor adjacent the discharge section and a transfer belt running on the bases and in the slots of the backs of the buckets of the article conveyor and mounted on said roller between the belts of the lower pair of belt conveyors to transfer the articles from the article conveyor to the belt conveyors.

5. In a machine for handling cylindrical articles, the combination of an endless article conveyor comprising a plurality of article buckets arranged in tandem fashion, each of said article buckets being constructed to hold one article with the axis thereof extending transversely of the article conveyor, said article conveyor having a substantially horizontal main course and a downwardly curving discharge section at a discharge end of the main course extending downwardly therefrom, each of said buckets having a base for supporting an article and a back extending upwardly from a leading edge thereof when the bucket is in the main course, upper and lower belt conveyors mounted adjacent the discharge section, said belt conveyors having spaced article engaging courses adapted to engage the articles therebetween, a roller supporting one end of the lower belt conveyor adjacent the discharge section, and a transfer belt running on the bases of the buckets of the article conveyor and mounted on said roller adjacent the lower belt conveyor to advance each article along the back of the bucket in which it is received when the bucket is in the discharge section and transfer the article from the article conveyor to the belt conveyors.

References Cited by the Examiner

UNITED STATES PATENTS

| | | | |
|---|---|---|---|
| 683,039 | 9/01 | Hagen | 198—102 |
| 2,069,872 | 2/37 | Burns | 198—22 |
| 2,205,628 | 6/40 | Morrison | 198—102 |

SAMUEL F. COLEMAN, *Primary Examiner.*

WILLIAM B. LA BORDE, *Examiner.*